Patented Jan. 17, 1950

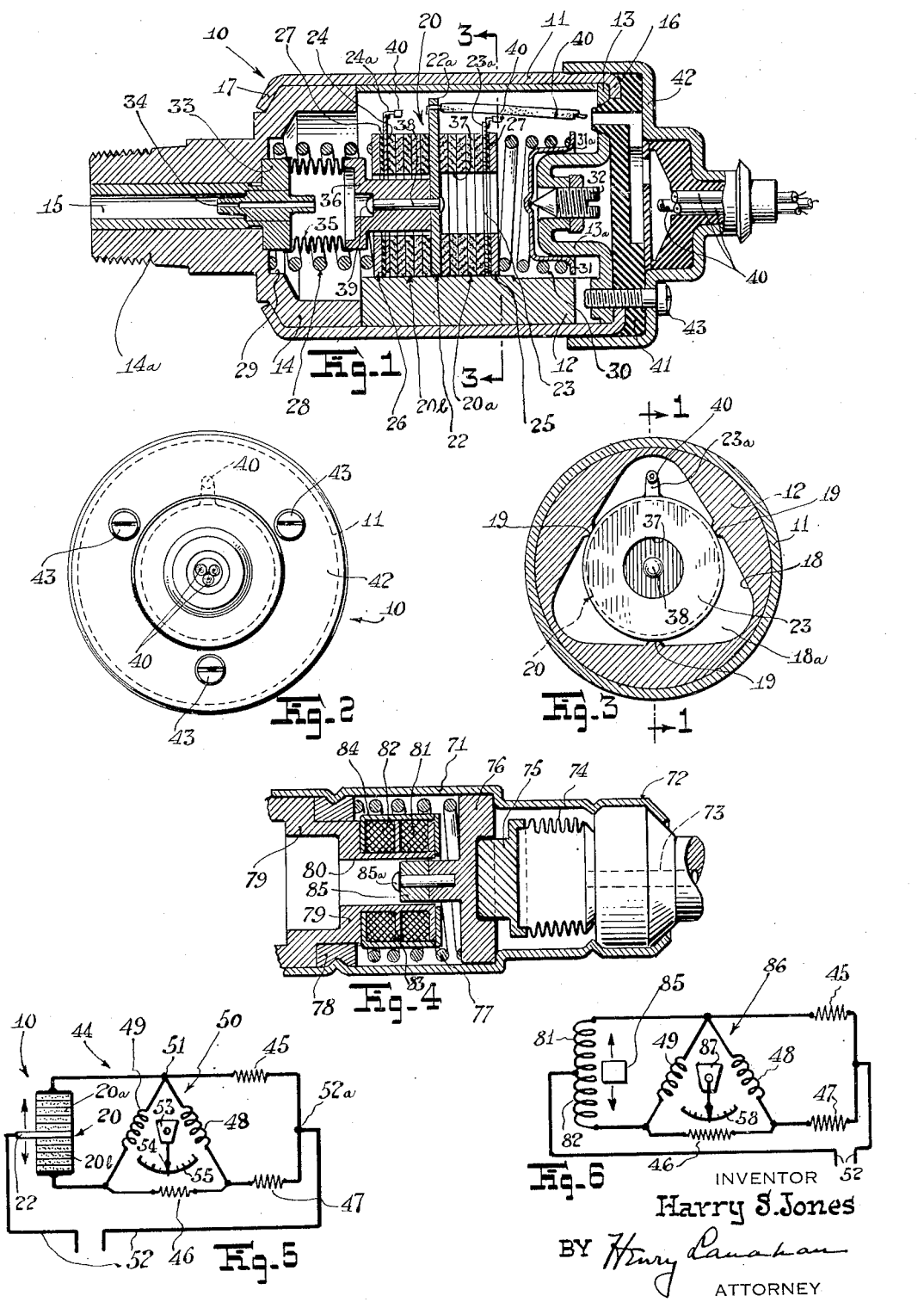

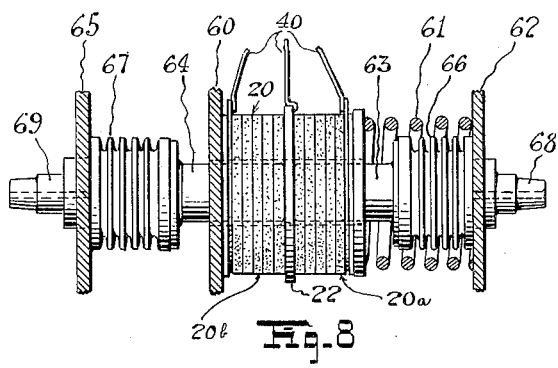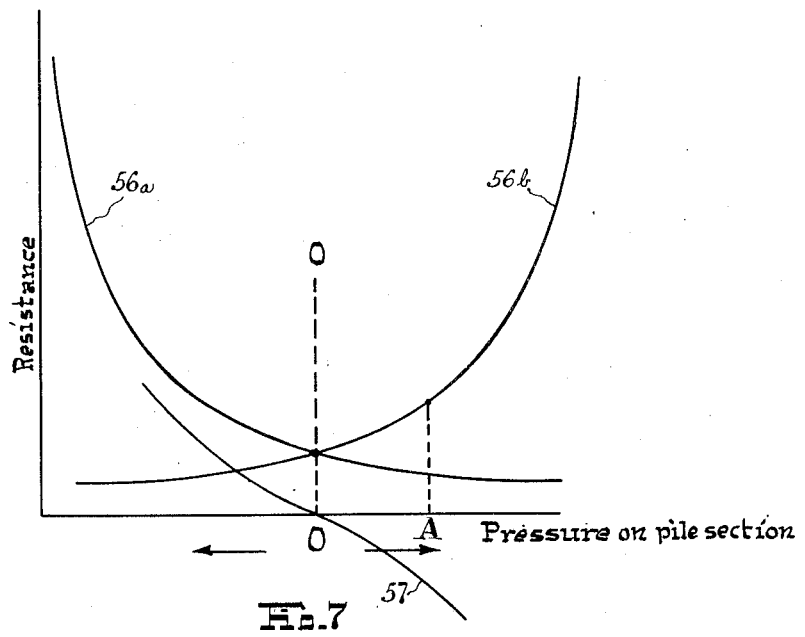

2,494,621

UNITED STATES PATENT OFFICE 2,494,621

PRESSURE-RESPONSIVE VARIABLE RESISTANCE DEVICE

Harry S. Jones, East Orange, N. J., assignor to Thomas A. Edison, Incorporated, West Orange, N. J., a corporation of New Jersey Application August 30, 1945, Serial No. 613,551

6 Claims. (Cl. 201—48)

This invention relates particularly to novel devices for indicating or measuring variations in a condition, and is by way of preferred example herein illustrated and described in terms of a remote pressure-indicating system.

It is an object to provide pressure transmitters for electrical measuring systems, which are adapted to enable the measurement of pressure and of conditions representable in terms thereof with a high degree of accuracy and of sensitivity notwithstanding that active components of the transmitter itself may be temperature-responsive and have non-linear characteristics.

It is a further object to provide novel and improved pressure-transmitting devices for such systems and improved mechanical constructions of such devices.

Other objects and features of my invention will more fully appear from the following description and the appended claims.

In the description of my invention reference is had to the accompanying drawings, of which:

Figure 1 is an axially sectional view of a transmitter according to my invention taken substantially on the line 1—1 of Figure 3;

Figure 2 is a right end view of this transmitter;

Figure 3 is a cross section taken on the line 3—3 of Figure 1;

Figure 4 is a principally axial section of a second form of pressure transmitter according to my invention;

Figure 5 is a bridge circuit for the transmitter of Figure 1;

Figure 6 is a bridge circuit for the transmitter of Figure 4;

Figure 7 is a graph illustrating certain response characteristics typical of the transmitter of Figure 1; and Figure 8 is a diagrammatic view of a differential-type transmitter of the character of that shown in Figure 1.

Reference being had particularly to Figure 1 there will be seen a pressure transmitter 10 according to my invention, which is of the resistance type. This transmitter has a cylindrical metal casing 11 in which there is fitted a cylindrical housing 12 made preferably of an insulating material such as Bakelite. One end of the housing (the right end as is seen in Figure 1) is closed by a metal disk 13 having a central inwardly-extending boss 13a, and the other end of the housing is closed by a cylindrical member 14 having a threaded nipple 14a with an axial opening 15 for coupling with the source of pressure to be measured. In the final assembly, the disk 13 and member 14 are clamped rigidly against the housing by spinning over the ends of the casing 11 at 16 and 17 as shown in Figure 1.

The housing 12 has a central opening 18 extending therethrough which may be substantially triangular in cross section as shown in Figure 3. The three walls of this opening preferably have extending ribs 19 running lengthwise of the opening. Within this opening there is disposed a pile 20 of disk-like elements including two sets of pressure-responsive resistance elements 20a and 20b, these elements being for example of copper—copper oxide such as is used in rectifiers, carbon or other material. Between these resistance elements there is a rigid disk 22 of electrically-conductive material, and at the ends of the pile sections 20a and 20b there are conducting disks 23 and 24. These latter disks are backed by disks 25 and 26 constituting rigid end walls for the pile 20 but between these end walls and the disks 23 and 24 are interposed insulating members 27. These pile elements are held in axial alignment within the opening 18 by the ribs 19 abovementioned. Preferably, the space in the opening 18 about the pile is filled with a damping medium 18a such as grease.

The pile 20 is preferably interposed between two compression springs 28 and 30. The spring 28 seats in a recess 29 of the member 14 and the compression spring 30 seats on a rim flange 31a of a cup-shaped member 31. This member 31 surrounds the boss 13a abovementioned and is adjustable inwardly and outwardly, to vary the static pressure on the pile elements, by a screw 32 threaded through this boss. The screw 32 has a pointed end engaging a central dome of the cup member 31 to provide a rock point about which the member may tilt and compensate for asymmetries in the parts to give a more nearly uniform pressure on the pile elements.

At the inner end of the axial opening 15 there is a plug 33 having a restricted inlet opening 34. Sealed to this plug is a bellows 35 which lies within the spring 28. The inner free end of this bellows is sealed to a cap 36 which is connected to the central conductor disk 22 of the pile 20. Preferably the pile elements, except for the disk 22, are annular-shaped to provide an axial opening 37 therethrough, and the cap is provided with a head 38 which extends through this opening to the central disk, the cap being rigidly secured to this disk by a rivet 39.

Normally the sections of the pile at opposite sides of the central disk 22 are under equal compression. Upon the bellows being expanded or contracted the central disk is displaced from equilibrium position to increase the compression of one section of the pile and decrease that of the other causing the resistance of these sections to vary oppositely—i. e., one to decrease and the other simultaneously to increase.

Circuit connections to the pile 20 are made by three leads 40 which connect respectively to terminals 22a, 23a and 24a of the disks 22, 23 and 24 respectively. These terminals extend into a corner space of the opening 18 and the leads 40 pass through an opening in the member 13 and through an insulating cap 41 that fits the end of the casing 11, this insulating cap having a metal sheath 42 embracing an end portion of the casing 11 and held firmly thereto by screws 43 which thread into the member 13.

In Figure 5 I illustrate one remote pressure-indicating system wherein the transmitter 10 is advantageously employed, this system comprising an electrical bridge 44 which broadly is of the type described and claimed in Kelly Patent No. 2,362,562 having a common assignee with the present application. This bridge has an upper branch including one section 20a of the pile 20 and a standard—i. e., normally fixed—resistance 45, and a second parallel branch including a second section 20b of the pile 20 and two standard resistors 46 and 47, in series. Across the central resistor 46 of the lower branch there are serially connected two field coils 48 and 49 of a ratiometer 50 diagrammatically shown. The junction of these coils is connected at 51 to the upper branch between the pile section 20a and resistance 45. The bridge is energized from a source of D.-C. or A.-C. current (not shown) by way of leads 52 which connect respectively to the central disk 22 of the transmitter and the junction 52a of the two branches of the bridge.

In this electrical bridge it will be seen that the pile sections 20a and 20b constitute one set of corresponding arms, and that the resistances 45 and 47 constitute a second such set. The coils 48 and 49 form with the central resistor 46 a so-called "electrical delta," and this delta constitutes the crossarm of the bridge.

Preferably I employ a D.-C. type of ratiometer 50 of the character described and claimed in the pending Fritzinger application Serial No. 569,083, filed December 20, 1944 (issued August 10, 1948, as Patent No. 2,446,579), and having a common assignee with the present application. For the present purposes this ratiometer is sufficiently described as comprising a pivoted magnet 53 with which there is carried a pointer 54 that registers with a scale 55. The magnet is magnetized transversely to its pivot axis. When one or the other of the field coils is energized the magnet aligns itself with the axis of that coil, but when both coils are energized the magnet assumes an intermediate position wherein the torques exerted thereon by the two coils are in balance. A characteristic of this ratiometer is that as the current increases by equal increments in one coil and decreases correspondingly in the other coil, the pointer is deflected by substantially equal intervals across the scale. It may however be noted that, if desired, this meter may be designed to have a non-linear characteristic as described in the abovementioned application.

When a D.-C. type of indicating instrument is used, the system is to be energized from a D.-C. source of current unless pile elements of the rectifying type are employed. In this case the system may be worked from either D.-C. or A.-C. current sources, while using a D.-C. indicating instrument, but it will be understood that the elements in the two pile sections must be properly polarized. In the particular system herein illustrated the current is to flow in the same direction through the two branches of the bridge, and therefore the pile sections 20a and 20b are to be polarized in opposite directions with respect to the central disk 22 as a reference point.

It will be noted that as the resistance of the pile section 20a increases and that of the section 20b decreases, the potential of junction 51 varies relative to the potentials at the extremities of the resistor 46, causing the current in one coil to increase and that in the other coil to decrease correspondingly. These variations in the pile resistances are accordingly indicated by the meter 50.

Typically, the resistances of the pile sections 20a and 20b vary with compression substantially as hyperbolic functions. A graphical representation of the resistance-pressure characteristics of the pile sections is shown in Figure 7 where the abscissa represents the pressure applied to the central disk 22 of the pile and the ordinants represent the resistances of the pile sections. Curve 56a represents the characteristic of pile section 20a for upward displacements of the central disk 22 as it appears in Figure 5, and curve 56b represents the analogous characteristic for the pile section 20b. The crossover point of these curves is the point of operation when the central disk 22 is in equilibrium. This point is moved downwardly and upwardly along the respective curves—i. e., the curves are shifted farther apart or closer together relative to the neutral axis 0—0—respectively as the screw 32 is tightened and loosened to decrease and increase the compression of the pile. When the bellows urges the disk 22 upwardly (as seen in Figure 5) the resistance of the pile section 20a decreases and that of the section 20b increases, the operating points on the curves 56a and 56b being now to the right of the neutral axis 0—0, say at the line A. The potential across the coils 48 and 49 of the ratiometer depends on the difference of the resistances of the pile sections. Since these resistances vary oppositely with change in the condition being measured, there is a marked increase in potential change across the coils 48 and 49 for a given change in that condition and, as a result, the system has a markedly greater sensitivity.

It will be further noted that the opposite variation in the resistances of the pile sections with change in the condition being measured results in a push-pull action analogous to that characteristic of a push-pull amplifier stage, which compensates greatly for the non-linear pressure-resistance characteristics of the individual pile sections. For instance, it will be noted that curve 57 in Figure 7—which represents the difference between the curves 56a and 56b—has a substantially greater degree of linearity than have either of the curves 56a and 56b. In fact, within a limited operating range, the characteristic 57 is essentially linear. Thus, notwithstanding that the respective pile sections have non-linear characteristics, a substantially linear response with variation in the condition being measured is obtained.

A further advantage of the present invention is that errors due to temperature changes of the transmitter are minimized. It is characteristic of many pile elements, in particular elements of copper oxide, that they undergo large resistance variations with temperature change. In the present system, however, the pile sections constitute corresponding arms of the two branches of the electrical bridge and like variations in their resistances caused by changing ambient temperature are therefore neutralized, with the result that temperature errors are greatly minimized.

It is a further feature of the present invention that errors due to non-linearity of the impedance elements of the transmitter are minimized. It is for instance typical of many pressure-responsive resistance elements that they undergo resistance changes with electrical current. Since ratiometer systems are intended especially for use in applications where the current source varies through substantial ranges, it is important that the system be compensated for such non-linearity of the resistance pile 20. In the present system this compensation is accomplished since like variations of the pile sections annul one another in the manner explained above with respect to the temperature compensation.

It is to be noted that it is desirable to use springs 28 and 30 in the transmitter 10 having different constants for different applications. In some applications, for instance, it may be desirable to minimize the fluid flow through the inlet orifice 34, in which case very stiff springs are used so that the end walls 25 and 26 will remain substantially stationary and the operation approximates a static basis; in fact, in this instance it may be desirable to eliminate the spring 28 and to rigidly secure the wall 26 to the frame. In other applications, however, it may be desirable that there be considerable fluid flow through the orifice 34 with varying fluid pressure. This would for instance be advantageous where it is desired to damp the effects of sharp fluctuations in fluid pressure, as by making the orifice 34 very small or providing any suitable means affording substantial resistance to fluid flow into and out of the bellows 35. In this latter application the springs 28 and 30 are made relatively flexible and initial compression of the pile is obtained by compressing the springs to a greater degree. With such springs the walls 25 and 26 move substantially in response to pressure variations in the bellows and the bellows undergo substantial expansion and contraction as the fluid pressure varies.

In Figure 8 there is shown diagrammatically a resistance-type transmitter which is worked according to the difference of two pressures. Here by way of example one end of the pile 20 is seated against a stationary wall 60 and a compression spring 61 is interposed between the other end of the pile and a stationary wall 62, there being here not shown, for simplicity of description, any means for adjusting this spring but it being understood that any suitable such means may be provided. Connected to the central disk 22 of the pile are two connecting rods 63 and 64 which extend centrally through the pile sections, and interposed between these rods and stationary walls 62 and 65 abovementioned are respective bellows 66 and 67 to which fluid communication is had by way of respective tubes 68 and 69. In this case the resultant force on the central disk 22 depends upon the difference in the pressures of the two bellows, and the indications of the meter 50 are according to that pressure difference.

In Figure 4 I illustrate an alternative form of pressure transmitter, which is of the inductance type. This transmitter has a casing 71 in one end of which there is secured a head 72 having an axial opening 73 therethrough for communication with a source of fluid pressure. Sealed to the inner end of the head is a bellows 74 having a cap 75 secured to its inner free end. This cap engages a movable non-magnetic plunger 76 which is maintained in contact therewith under pressure of a compression spring 77, this spring seating against a ring 78 that is anchored to the casing. Supported by this ring is a coil frame 79 extending through the spring 77 and having an axial opening 80. On this frame within the spring 77 there are mounted two inductance coils 81 and 82. The coil frame is of non-magnetic material, say Bakelite, but between the coils there is an annular magnetic wall 83, and surrounding the coils exteriorly thereof is a magnetic sheathing 84. Adjustably connected to the plunger 76 by a non-magnetic element 85a is a magnetic core 85 which is disposed within the opening 80. This core has a length equal approximately to the axial length of one of the coils. When the bellows is in an unexpanded state the core bridges the coil 81 and provides a substantially equal iron circuit for the flux of the coil; the coil 82 now however has an air-cored flux circuit. Thus for this condition the inductance of coil 81 is high and that of coil 82 is relatively low. When the bellows 74 is expanded the core bridges coil 82 and the inductance of the latter coil is high and that of coil 81 is low. Thus the inductances of the coils vary oppositely in response to pressure changes in the bellows.

In Figure 6 there is shown a bridge circuit including the transmitter of Figure 4. This circuit is of the same type as that of Figure 5, except that the coils 81 and 82 here replace the pile sections 20a and 20b. The power source in this case must be A. C. Also, the ratiometer, referred to as 86, must be of the A.-C. type unless the coil currents are rectified. For instance, the meter may comprise the same field coils 48 and 49, but the rotor will include a vane 87 of non-permanent magnet material. The operation of the circuit and meter will however be the same as described above with respect to Figure 5, and the same advantages in respect of improved sensitivity, greater linearity of response and freedom from errors here accrue as in the system of Figure 5.

While I have herein illustrated and described my invention in terms of certain preferred embodiments, it will be understood that these embodiments are subject to changes and modifications without departure from the scope of my invention, which I endeavor to express according to the following claims.

I claim:

1. A pressure transmitter for remote condition-indicating systems comprising a pile including flat annular resistance elements responsive to pressure, said pile being held substantially fixed at its ends under a predetermined compression, a conductor plate between said resistance elements at the center of said pile, a pressure-responsive expansible member, and means extending axially through the portion of said pile at one side of said conductor plate and coupling said member to said conductor plate.

2. A pressure transmitter for remote pressure-indicating systems comprising a housing having a chamber substantially triangular in cross section, a pile of circular disk-shaped elements including pressure-responsive elements held under pressure within said chamber, the elements of said pile being held aligned by the walls of said chamber, conductor elements at the ends and center of said pile having electrical terminals, a section of said pile at one side of said central conductor element having an axial opening therethrough, a pressure-responsive expansible member at one end of said chamber, and means extending through said axail opening for coupling said expansible member to said central conductor element.

3. A pressure transmitter for remote pressure-indicating systems comprising a pile including a central conductor member and sections of presure-responsive resistance elements at each side of said member, means holding said pile substantially fixed at its ends and under a predetermined compression, and a pair of expansible pressure-responsive members coupled in opposed relation to said central member.

4. The transmitter set forth in claim 3 wherein said resistance sections have axial openings extending therethrough, and said expansible members are coupled respectively by way of said openings to said central member.

5. A pressure transmitter for a remote condition-indicating system comprising a pile including pressure-responsive resistance elements, a compression spring bearing against one end of said pile for placing the pile under a predetermined static compression, means for varying the compression of said pile according to a condition to be measured, a seat interlockingly engaging the other end of said spring, and a backing member for said seat having a pointed end rockingly engaging the seat at the axis of said pile.

6. A pressure transmitter comprising two piles of pressure-responsive resistance elements, a movable intervening member between said piles, a single adjustable means acting on said piles to hold both under compression, and a pressure-actuatable member coupled to said intervening member for varying oppositely the compression of said piles, said intercoupled pressure-actuatable member and intervening member being freely mounted so as to exert substantially no restraint on said piles when in an unactuated state whereby both piles are placed under the same initial compression by said single adjustable means.

HARRY S. JONES.

REFERENCES CITED

The following references are of record in the file of this patent:

UNITED STATES PATENTS

| Number | Name | Date |
|---|---|---|
| 965,059 | Apple | July 19, 1910 |
| 1,417,151 | Donop | May 23, 1922 |
| 1,528,627 | Peters | Mar. 3, 1925 |
| 1,897,811 | Martin | Feb. 14, 1933 |
| 2,013,106 | Nagel | Sept. 3, 1935 |
| 2,045,474 | Kemler | June 23, 1936 |
| 2,240,184 | Hathaway | Apr. 29, 1941 |

FOREIGN PATENTS

| Number | Country | Date |
|---|---|---|
| 705,669 | France | Mar. 16, 1931 |